United States Patent

Donnelly, Sr. et al.

[11] 4,130,040
[45] Dec. 19, 1978

[54] CUTTER ASSEMBLY

[75] Inventors: Charles W. Donnelly, Sr.; Larry R. Stauffer, both of Camp Hill, Pa.

[73] Assignee: AMP Incorporated, Harrisburg, Pa.

[21] Appl. No.: 827,041

[22] Filed: Aug. 23, 1977

[51] Int. Cl.² .......................... B26D 5/10; H02G 1/12
[52] U.S. Cl. ...................................... 83/389; 83/685; 83/568; 83/694; 83/925 R
[58] Field of Search ................ 83/685, 389, 387, 568, 83/694, 690, 925

[56] References Cited

U.S. PATENT DOCUMENTS

| | | | |
|---|---|---|---|
| 2,394,346 | 2/1946 | Wiedman | 83/387 |
| 2,789,640 | 4/1957 | Belden | 83/568 |
| 3,396,620 | 8/1968 | Raphael et al. | 83/685 |
| 3,444,506 | 5/1969 | Wedekind | 339/99 |
| 3,525,279 | 8/1970 | Christian | 83/389 |
| 3,673,902 | 4/1972 | Strobel | 83/685 |
| 4,046,045 | 9/1977 | Stevens | 83/694 |

Primary Examiner—Donald R. Schran
Attorney, Agent, or Firm—Russell J. Egan

[57] ABSTRACT

A cutter assembly is disclosed for accurately profiling the free end of multi-conductor flat flexible cable for termination by known electrical connectors. The assembly includes a pair of fixed, parallel, spaced side shears and a transverse end shear. A cable is held in the assembly between a fluted shear plate and a spring biased pressure plate. The cutter assembly is actuated by conventional press means.

8 Claims, 9 Drawing Figures

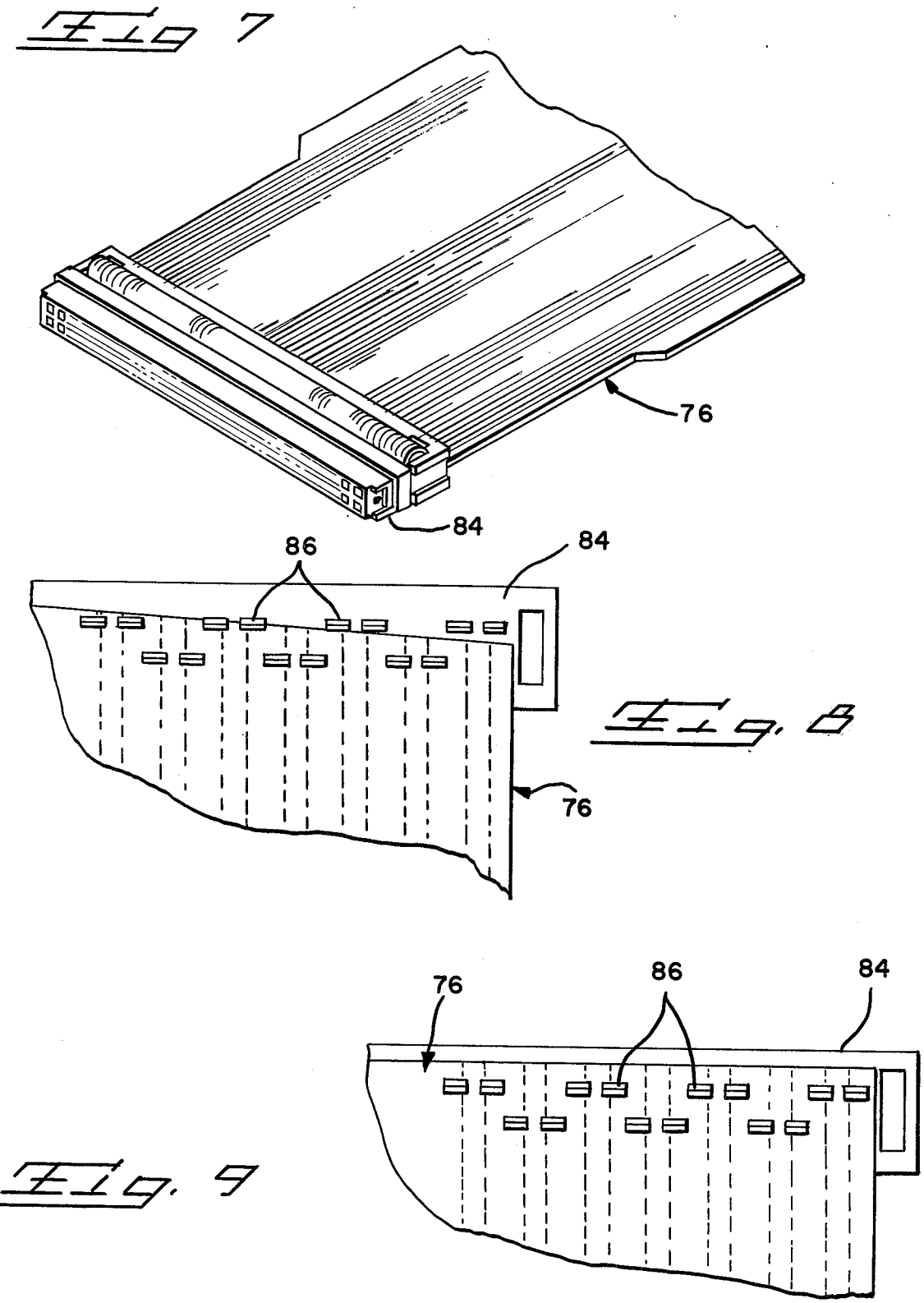

CUTTER ASSEMBLY

BACKGROUND OF THE INVENTION

1. The Field of the Invention

The present invention relates to a multi-conductor flat flexible cable cutter assembly and in particular to a cutter assembly which accurately profiles the sides and end of a cable for subsequent termination by a known connector.

2. The Prior Art

Multi-conductor flat flexible cables are well known in the electrical industry. These cables are made in a wide variety of configurations and primarily comprise a plurality of parallel spaced conductors embedded in insulation material. The cable can include shielding grids if desired. The insulation layer is preferably extruded around the conductors and may be profiled on one or both surfaces with a ribbed configuration that substantially conforms to the positioning of the conductors within the cable. Examples of how such cables are fabricated can be found in U.S. Pat. Nos. 3,005,739, and 3,082,292.

The cables with an extruded insulation generally have a medial flash or flange which, while remaining within tolerances, is sufficiently uneven that the side edges of the cable are unsuitable for use as guides when terminating the cable. Some electrical connectors rely on the side edges of the cable for alignment purposes when effecting termination of the cable, see U.S. Pat. No. 3,444,506 for an example. Thus it becomes necessary to trim the end of the cable so that it has an accurate profile which may be used with assurance that proper termination of the conductors will be effected.

SUMMARY OF THE INVENTION

The present invention concerns a cutter assembly for accurately profiling the ends of multi-conductor flat flexible cable. The cutter assembly includes a base member adapted to be movably mounted in a press so as to be moved from a remote location to a position beneath a ram of the press. A pair of side shear members are fixed to the upper surface of the base member in a spaced, parallel arrangement and a transverse shear is fixedly positioned between and at one end of the side shear members. A shear member is mounted for relative movement toward the base member and includes a shear plate having one surface profiled by a plurality of ridges, ribs or flutes on the surface thereof and a pressure plate biased against the profiled surface of the shear plate. The shear member is adapted to be received between the side shear members and to receive therein the transverse shear member.

It is therefore an object of the present invention to produce an improved cutter assembly which will accurately profile the end of a multi-conductor flat flexible cable for the subsequent termination thereof.

It is another object of the present invention to produce a cutter assembly which does not rely on the marginal portions of a multi-conductor flat flexible cable to effect an accurate profiling of the free end of the cable.

It is a further object of the present invention to produce a cable cutting assembly which will accurately profile the end of a multi-conductor flat flexible cable to have parallel spaced marginal edges and a transverse end edge extending perpendicular to the marginal edges.

It is also an object of the present invention to produce a cable cutting assembly which can be readily and economically manufactured.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 7 is a perspective view of a known connector terminating a multi-conductor cable profiled by the subject cable cutter assembly;

FIG. 8 is a plan view of a connector graphically illustrating problems arising from inaccurate trimming of the end of a cable; and FIG. 9 is a plan view, similar to FIG. 8, showing a known connector terminating cable profiled by the subject cable cutter assembly.

DETAILED DESCRIPTION OF THE PREFERRED EMBODIMENT

Figure 1:
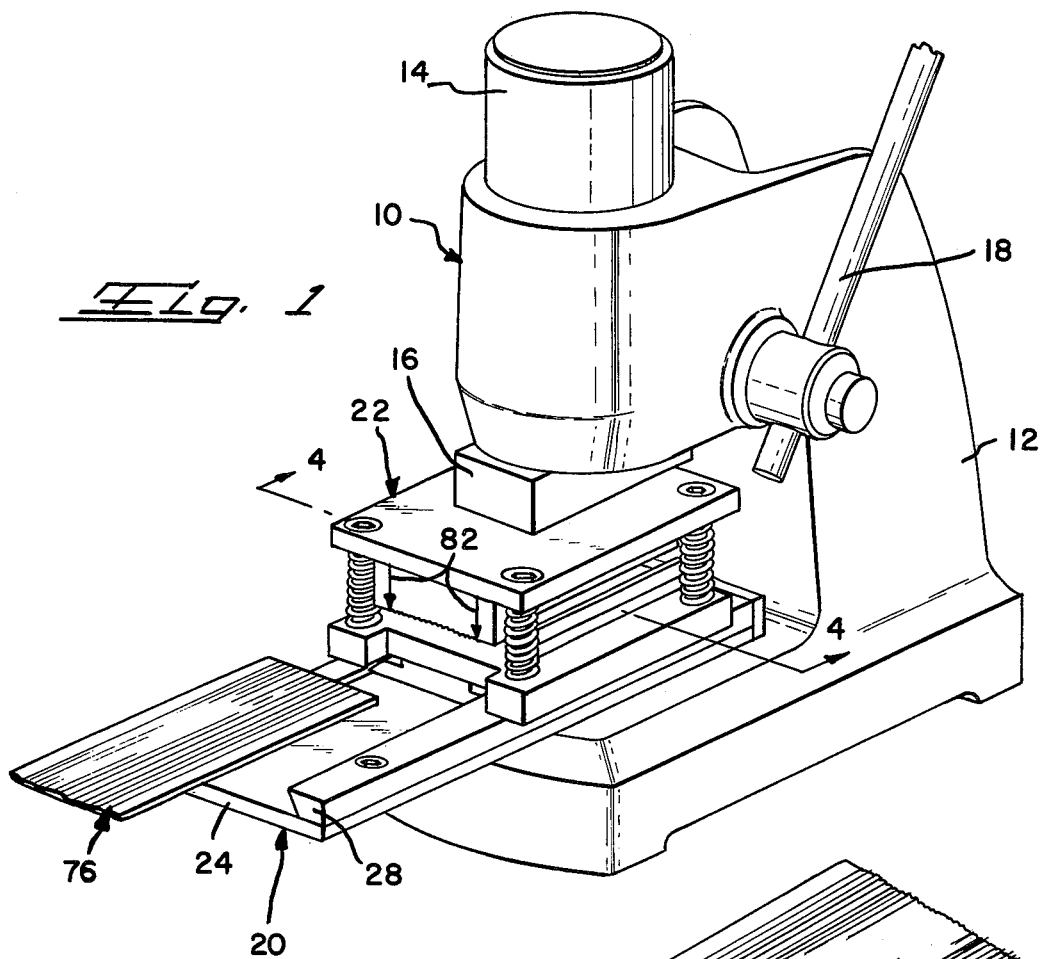
FIG. 1 is a perspective view of the subject cable cutter assembly mounted in a convention manual press.
Figure 2:
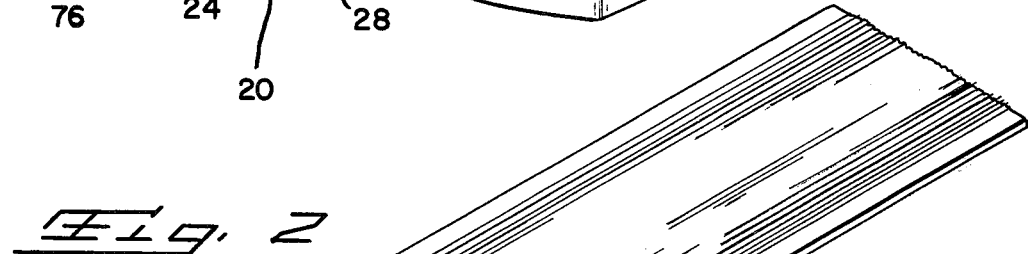
FIG. 2 is a perspective view of a section of shielded multi-conductor flat flexible cable of the type which can be profiled by the subject cable cutter assembly.

The bench press assembly 10, shown in FIG. 1, is a conventional press of the general type disclosed in U.S. Pat. Nos. 4,020,540 and 4,035,897. The press includes a substantially C-shaped frame 12, an applicator ram 14 including a press foot 16 mounted for vertical movement in an upper portion of the frame, ram actuation means 18, guide rail means 20 fixed to a lower portion of the frame, and a cable cutter assembly 22 slidably mounted on the guide rail means 20. The frame has been shown in a non-limiting configuration suitable for bench mounting. Clearly other suitably shaped frames could be substituted for the one shown. The ram actuation means 18 has been shown as a lever which would work conventional rack and pinion, or other suitable gearing (not shown) to drive the ram 14. The actuation means 18 shown could be replaced by any suitable powered drive means, such as a fluid actuated motor, without departing from the spirit or scope of the subject invention. The guide rail means 20 includes a base plate 24 and a pair of fixed side guides 26, 28 defining therebetween channel 30 having a dove tail configuration.

The subject cable cutter assembly 22 is mounted in the guide rail means 20 for reciprocal movement between a point beneath ram 14 and a point remote from the ram. The cable cutter assembly 22 includes a base member 32 having a dove tail shaped slide 34 secured to the bottom thereof for sliding engagement in the channel 30. A pair of side shears 36, 38 are fixedly mounted on the base member 32 in parallel spaced alignment. An end shear 40 is fixed to the base member 32 between and adjacent one end of the side shears 36, 38.

A shear assembly 42, including a header plate 44, and a shear member 46 secured thereto, is supported above the base member 32 by front and rear posts 48, 50 and their associated compression springs 52, 54. The shear member 46 is dimensioned to fit between side shears 36, 38 and cause a scissor-like shearing action therebetween. The face 56 of the shear member 46 is provided with a plurality of spaced parallel flutes, recesses or ridges. A cable stop abutment 58 extends from the face 56 transversely across the shear member 46 and the flutes, recesses or ridges. A transverse end shear recess 60 extends across the shear member 46 forward of the stop flange 58.

A pressure plate 62 is biased against face 56 of the shear member 46 by springs 64, 66. The pressure plate 62 is guided for vertical movement with the shear assembly 42 by pins 68, 70 which slide freely within passageways 72, 74 in the base member 32.

The cable 76 shown is of conventional and well known design and includes a plurality of parallel spaced conductors and an isolation grid embedded in an insulation material. The surface of the cable adjacent the conductors has a ribbed configuration with a recess lying substantially centered between adjacent conductors. The insulation extends beyond the outermost conductors to form edge flanges 78, 80. A primary difficulty encountered with such cable is that the edge flanges 78, 80 vary sufficiently in width that it is impossible to rely on the cable edges as guides when terminating the cable with a known connector 84, for example the connectors shown in U.S. Pat. Nos. 3,820,055 and 3,820,058. It is also highly desirable to have the end of the cable cut perpendicular to the conductors to assure all conductors will be properly terminated.

Figure 3:
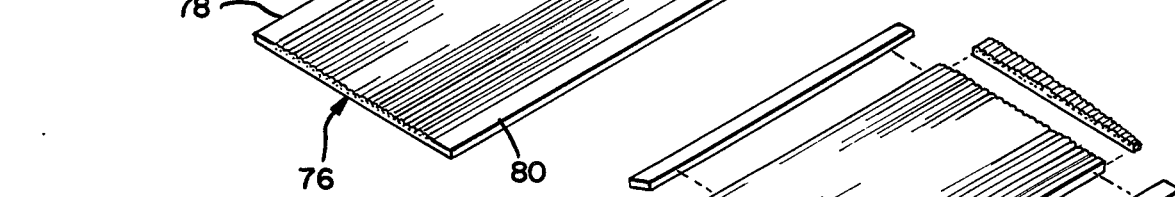
FIG. 3 is a perspective view showing the cable of FIG. 2 after profiling the subject cable cutter assembly.
Figure 3:
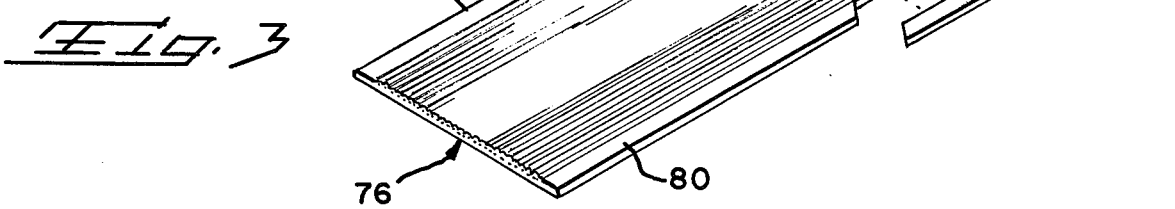
Figure 4:
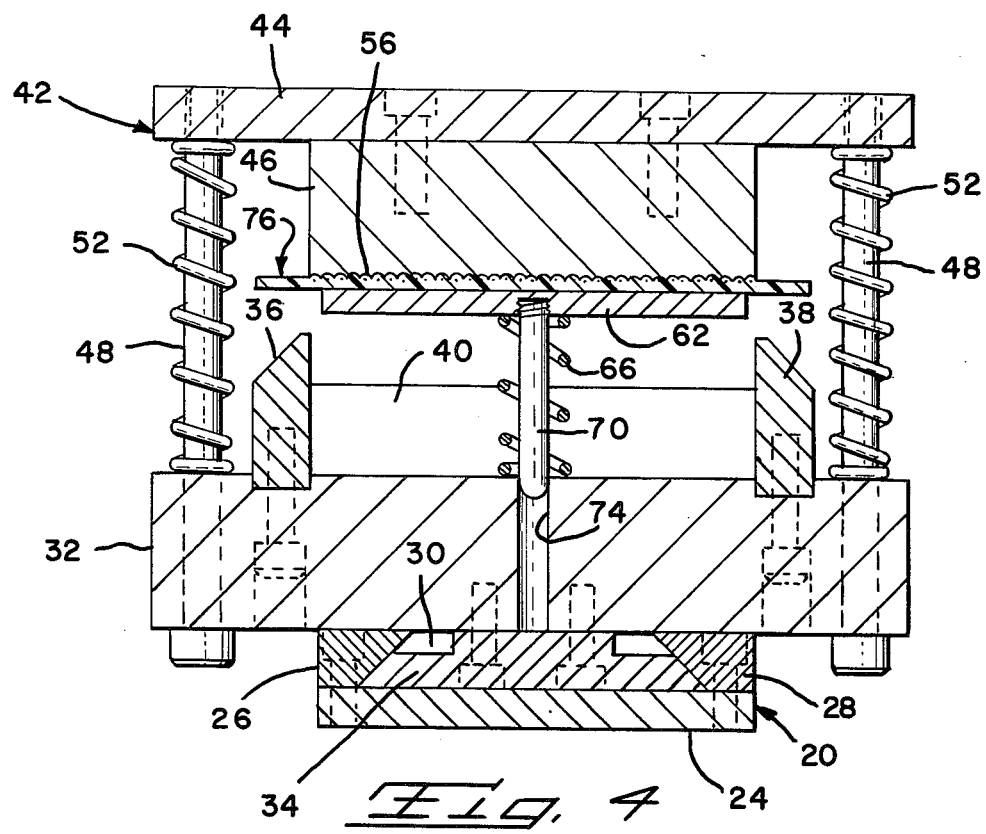
FIG. 4 is a transverse vertical section through the subject cable cutter assembly taken along line 4—4 of FIG. 1.
Figure 5:
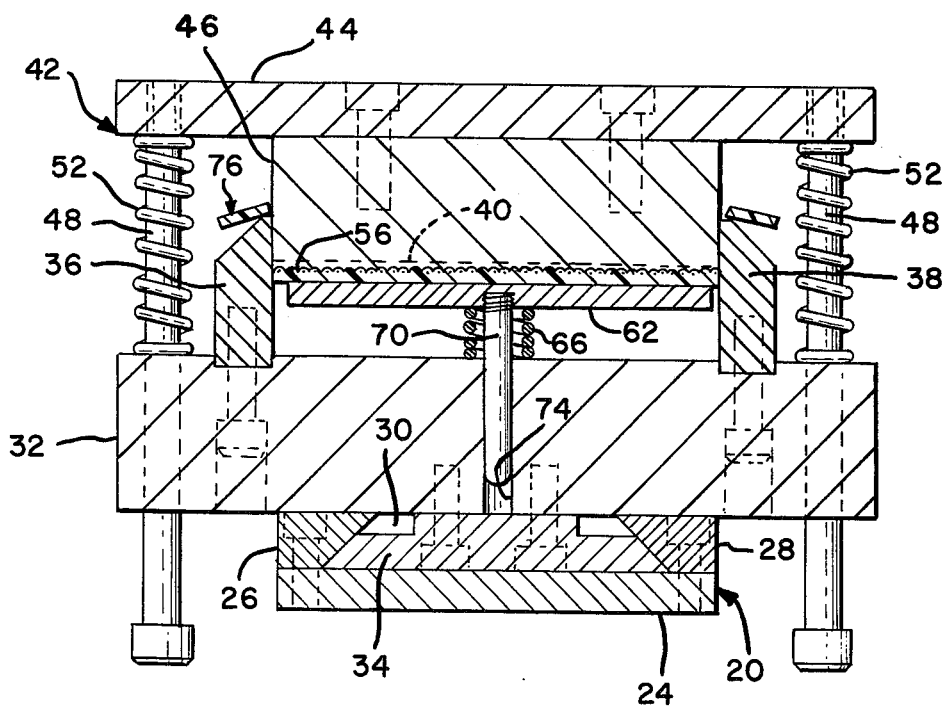
FIG. 5 is a transverse vertical section, similar to FIG. 4, showing the subject cable cutter assembly in an actuated condition.
Figure 6:
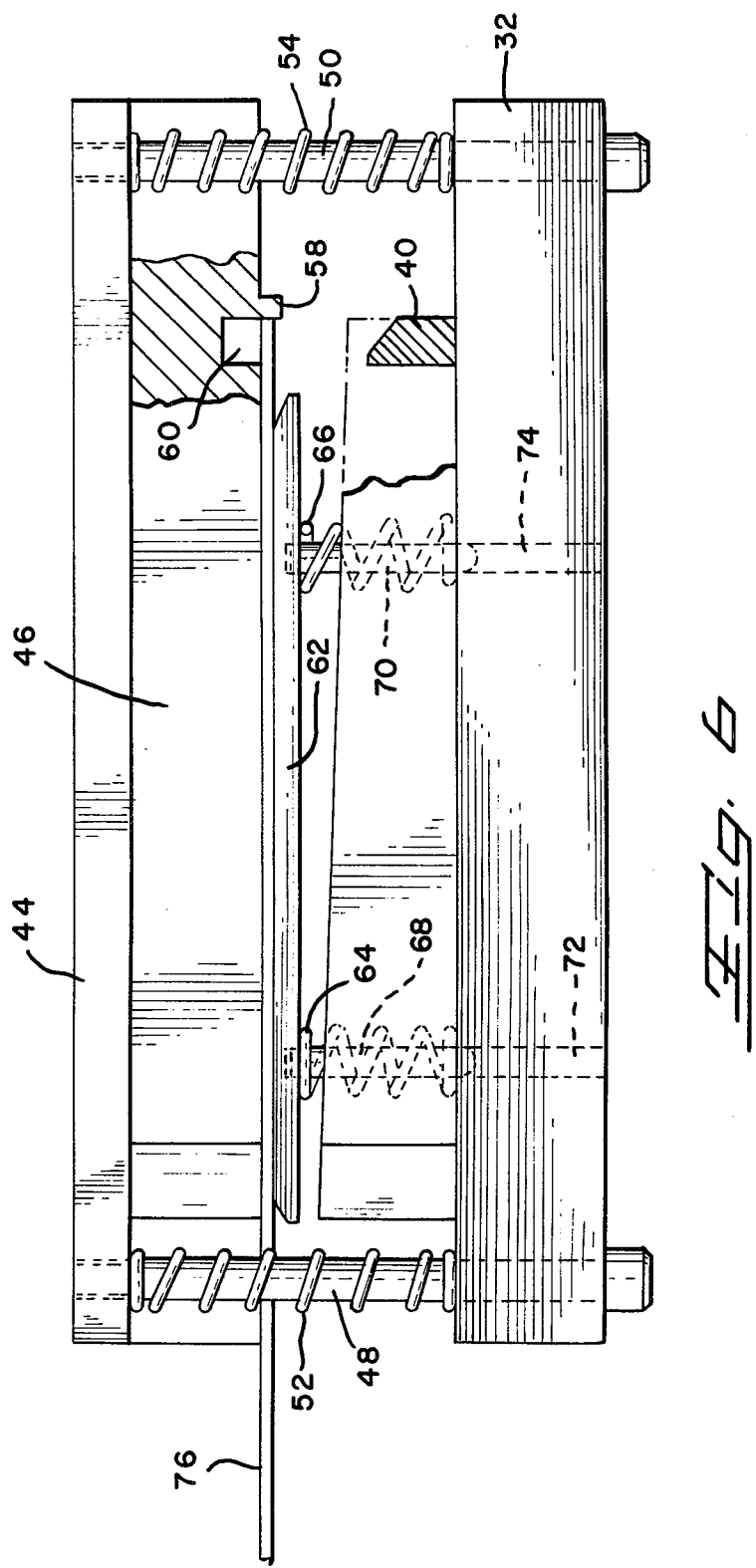
FIG. 6 is a longitudinal vertical section through the subject cable cutter assembly with a cable in place but prior to actuation.

Proper profiling of the end of a cable 76 is achieved by inserting the cable into the cutter assembly 22 between face 56 of the shear member and pressure plate 62 in a "ribs up" condition. The front end of the shear member 46 is preferably provided with alignment indicia 82 which can be used to align the outer most conductors of the cable, or any conductor therein which can be readily identified for alignment purposes. The flutes or ridges will enter recesses between ribs in the cable to assure accurate positioning of the cable while the pressure plate assures that the cable will remain flat and not be buckled. It should be noted that there need not be a one to one ratio of the flutes or ribs to the recesses between the ribs of the cable. It is only necessary to provide an adequate number of flutes to assure gripping of the cable. The cable is slid forwardly into the cutter assembly until the end strikes abutment 58. The entire cutter assembly 22 is then slid rearwardly to be positioned beneath ram 14. The ram is then actuated to drive the shear assembly 42, and cable 76 carried thereby, downwardly causing a flat simultaneous shearing of the side flanges 78, 80 of the cable 76, as shown in FIG. 5, and a second subsequent shearing of the end of the cable. Thus the cable is accurately profiled to the configuration shown in FIG. 3.

FIGS. 7 and 9 show cable 76 profiled by the subject cable cutter assembly and terminated by a known connector 84. It can be appreciated from FIG. 9 how the accurate profiling of the cable helps significantly in terminating a cable. The cable of FIG. 8 has been inaccurately profiled in that the end of the cable is not cut perpendicular to the conductors. This can result in some conductors missing engagement with a respective terminal 86, pulling loose from the terminal or even the side flange of the cable interfering with closure of the connector. This cannot happen when cable is profiled by the cable cutter assembly of the present invention.

The present invention may be subject to many modifications and changes without departing from the spirit or essential characteristics thereof. Thus the above described embodiment should be considered in all respects as illustrative and not restrictive of the scope of the invention.

What is claimed is:

1. A cutter assembly for profiling the free end of multi-conductor flat flexible cables and the like, said assembly comprising:
   a base member;
   shear means secured to and extending from said base member defining a profile including a pair of fixed parallel spaced sideblades and a fixed transverse end blade normal to said side blades adjacent one end thereof;
   a shear head mounted for reciprocal movement with respect to said base member and receivable within said profile;
   cable stop means on said shear head beyond said transverse end wall of said profile; and
   means to hold a cable against said shear head whereby relative movement of said shear head towards said base member causes a shearing action between said shear means and said shear head.

2. A cutter assembly according to claim 1 wherein said base member further comprises:
   means for mounting said cutter assembly in a press for movement between a first position beneath a ram of said press and a second position remote from and clearing said ram whereby said cutter assembly is actuated by said press.

3. A cutter assembly according to claim 1 wherein said shear head further comprises a cable engaging face having a plurality of parallel, spaced flutes formed therein, said flutes engaging between ribs on said cable to prevent transverse movement of said cable across said face.

4. A cutter assembly according to claim 3 wherein said flutes on the cable engaging face of said shear head are on a less than 1 to 1 ratio with the ribs on said cable.

5. A cutter assembly according to claim 1 wherein said shear head further comprises indicia for alignment of said cable with respect to said cutter assembly.

6. A cutter assembly according to claim 1 wherein said shear head further comprises:
   at least one shear means receiving recess in said cable receiving face.

7. A cutter assembly according to claim 1 wherein said means to hold said cable against said shear head comprises:
   a pressure plate biased against a cable receiving face of said shear head, said pressure plate being moveable with said shear head to carry said cable into cutting engagement with said shear means.

8. In combination with a press having a frame, a ram, and ram actuation means, a cutter assembly for profiling a free end of multi-conductor flat flexible cables and the like, said cutter assembly comprising:
   a base member mounted on said press frame so as to be moveable between a first position beneath said ram and a second position remote from and clearing said ram, shear means secured to and extending from said base member defining a profile including a pair of fixed, parallel, spaced side blades, and a fixed transverse end blade normal to said side blades adjacent one end thereof, a shear head mounted on said base member for reciprocal movement therebetween, said shear head being receivable within said profile to cause a shearing action with said shear means;

cable stop means fixed to said shear head beyond said transverse end blade; and means to hold said cable against said shear head and moveable therewith whereby cable carried thereby is sheared to said profile upon actuation of said press.

* * * * *